United States Patent [19]

Kowalski

[11] Patent Number: 5,054,978

[45] Date of Patent: Oct. 8, 1991

[54] CHANNEL NUT

[75] Inventor: Joseph W. Kowalski, Florissant, Mo.

[73] Assignee: B-Line Systems, Inc., Highland, Ill.

[21] Appl. No.: 645,150

[22] Filed: Jan. 24, 1991

Related U.S. Application Data

[63] Continuation of Ser. No. 479,341, Feb. 13, 1990, abandoned.

[51] Int. Cl.⁵ .................... F16B 27/00; F16B 37/08
[52] U.S. Cl. ............................. 411/85; 411/104; 411/432
[58] Field of Search ............... 411/84, 85, 103, 104, 411/105, 108, 111–113, 182, 173, 177, 432, 552, 427

[56] References Cited

U.S. PATENT DOCUMENTS

| Re. 17,870 | 11/1930 | Carr . | |
|---|---|---|---|
| 1,466,176 | 8/1923 | Kraft . | |
| 1,732,992 | 10/1929 | Spiro . | |
| 2,314,509 | 3/1943 | Olson . | |
| 2,383,141 | 8/1945 | Maage, Jr. | 411/435 |
| 2,469,312 | 5/1949 | Poupitch . | |
| 2,571,394 | 10/1951 | Trafton . | |
| 2,649,126 | 8/1953 | Tinnerman . | |
| 2,676,680 | 4/1954 | Kindorf | 189/35 |
| 2,681,679 | 6/1954 | Poupitch . | |
| 2,682,906 | 7/1954 | Poupitch . | |
| 2,684,703 | 7/1954 | Crowther . | |
| 2,705,991 | 4/1955 | Reiner . | |
| 2,767,609 | 10/1956 | Cousino | 411/85 |
| 2,767,951 | 10/1956 | Cousino | 248/245 |
| 2,862,537 | 12/1958 | Poupitch . | |
| 2,944,642 | 7/1960 | Evans | 189/36 |
| 3,020,946 | 2/1962 | Mills . | |
| 3,114,404 | 12/1963 | Fiddler . | |
| 3,164,191 | 1/1965 | Grimm et al. . | |
| 3,192,982 | 7/1965 | Rohe et al. . | |
| 3,217,585 | 11/1965 | Munse . | |
| 3,483,910 | 12/1969 | La Londe et al. . | |
| 3,493,025 | 2/1970 | La Londe et al. . | |
| 3,599,693 | 8/1971 | Bucheli . | |
| 3,680,620 | 8/1972 | Gotschel et al. . | |
| 3,783,922 | 1/1974 | Petrus . | |
| 4,043,245 | 8/1977 | Kaplan | 411/346 |
| 4,146,074 | 3/1979 | Kowlaski . | |
| 4,263,952 | 4/1981 | Kowalski | 411/112 |
| 4,285,379 | 8/1981 | Kowalski | 411/85 |
| 4,391,546 | 7/1983 | Lyon | 403/189 |
| 4,410,298 | 10/1983 | Kowalski | 411/112 |
| 4,460,299 | 7/1984 | Kowalski | 411/85 |
| 4,486,133 | 12/1984 | Pletcher | 411/84 |
| 4,488,844 | 12/1984 | Baubles | 411/85 |
| 4,545,697 | 10/1985 | Verdenne et al. | 403/230 |
| 4,571,135 | 2/1986 | Martin et al. | 411/85 |
| 4,575,295 | 3/1986 | Rebentisch | 411/85 |
| 4,645,393 | 2/1987 | Pletcher | 411/84 |
| 4,666,355 | 5/1987 | Stover | 411/85 |
| 4,695,212 | 9/1987 | Berecz | 411/85 |
| 4,741,582 | 5/1988 | Peroni | 312/257 SK |
| 4,758,124 | 7/1988 | Ingeberg | 411/85 |
| 4,768,907 | 9/1988 | Gauron | 411/85 |
| 4,784,552 | 11/1988 | Rebentisch | 411/85 |
| 4,830,531 | 5/1989 | Condit et al. | 403/348 |
| 4,840,525 | 6/1989 | Rebentisch | 411/85 |
| 4,863,327 | 9/1989 | Poupiter | 411/112 |
| 4,895,484 | 1/1990 | Wilcox | 411/85 |

*Primary Examiner*—Neill R. Wilson
*Attorney, Agent, or Firm*—Senniger, Powers, Leavitt & Roedel

[57] ABSTRACT

A channel nut which can be economically made for securing parts to metal framing (e.g. channel framing) having side flanges with inwardly turned, hook-shaped lips defining a slot therebetween. The channel nut comprises an elongate body having inside and outside faces, opposite sides and opposite ends, a width less than that of the slot and a length greater than the width of the slot. The bottom includes side flanges and is preferably formed in rhomboid sections from channel metal. A tapped hole extends through the bottom.

32 Claims, 4 Drawing Sheets

CHANNEL NUT

CROSS-REFERENCE TO RELATED APPLICATION

This is a continuation of application Ser. No. 479,341, filed Feb. 13, 1990, now abandoned.

BACKGROUND OF THE INVENTION

This invention relates to channel nuts for fastening objects to metal channel framing wherein the nut is positioned crosswise in the channel during securing of the object to the channel.

Metal framing is commonly used for electrical, mechanical and industrial supports such as for lighting fixtures, pipes and so forth. The framing is formed as a channel having side flanges with opposing, inwardly turned, hook shaped lips defining a slot therebetween. An elongated nut which is narrower and longer than the width of the slot is typically used for securing objects to the framing. As such, the nut is first aligned with the framing and then turned crosswise with the nut engaging the lips of the channel. An object such as a bracket for a lighting fixture is then locked into position by means of a bolt extending through the object and threaded into a tapped hole in the nut.

A channel nut typically has an inside face, an outside face, opposite sides and opposite ends. Diagonally opposite corners of the nut are rounded to facilitate installation. A tapped hole for threadably receiving a bolt extends completely through the nut from the outside face to the inside face of the nut. Parallel slots with upstanding teeth extend across the outside face of the nut at opposite sides of the threaded hole for gripping the channel lips. The solid steel channel nuts presently in common use are made in a multistep process from bar stock, sections of which are first perforated with a pilot hole. The section is then coined to form the parallel slots with teeth, tapped to form the threaded hole and diagonal corners rounded off. If a lead in is provided for the bolt, the tapped hole is countersunk on the outside face of the nut. If a clamp is provided for holding the channel nut in its crosswise position prior to and during securement of the object to the channel, the solid steel nut may be further processed. For example, the clamp used in U.S. Pat. No. 4,146,074 requires that the sides of the nut be slotted which dictates a separate broaching step with its attendant costs. The fastener disclosed in U.S. Pat. No. 4,410,298 has no slot but it requires drilling a pair of holes in the inside face of the nut.

Not all applications for channel nuts require the strength provided by a solid steel channel nut. In addition to cost, solid steel channel nuts have other disadvantages, one being that the tapped hole is at the level of the inside faces of the framing when the nut is in crosswise position. Thinner nuts are used for shallow channel, increasing the number of different nuts which have to be stocked, but the minimum depth of the channel is still limited because the bolt must make a necessary number of turns in the nut before it is stopped.

SUMMARY OF THE INVENTION

Among the several objects of this invention may be noted the provision of a channel nut which is economical to produce; the provision of a channel nut which is adequately strong for many applications; and, the provision of a channel nut which fits a wide range of channel depths, including very shallow.

Briefly, an improved channel nut of this invention, which is useful for securing an object or a part to metal framing having a slot and inside and outside faces on opposite sides of the slot, comprises an elongate body having a bottom with an inside face and an outside face, opposite sides and opposite ends. The opposite sides have flanges with a top edge and opposite ends and the bottom has a tapped hole which extends therethrough. The width of the body including the flanges is less than the width of the slot in the framing so that the body may be generally aligned with the slot, entered into the slot and passed through the slot from the outside to the inside of the framing and then turned to extend in generally crosswise position relative to the slot for engagement with the inside faces of the framing at opposite sides of the slot.

For added strength, the bottom of the elongate body is preferably rhomboid in shape so that diagonally opposite corners are offset to facilitate turning the body generally crosswise in the channel and so that the area of contact with the inside faces of the framing is increased to assure that the fastener remains in position on the channel. It is further preferred that parallel grooves or notches extend across the channel nut adjacent the ends thereof. The grooves are sloped opening outwardly from the bottom for better engagement with the inside faces of the framing. The nut is preferably cut from sheet metal with the side flanges integrally formed with the bottom and the hole is preferably punched extruding metal forming the collar in the same operation. When the hole is punched in a direction from the outside to the inside face of the bottom, the punch forms a recess around the hole which serves as a lead in for the bolt. On the other hand, when the hole is punched in a direction from the inside face to the outside face of the bottom, the outside face of the bottom presents a smooth surface to the inside of the channel raceway against which conductors can be packed without damage.

Other objects and features will be in part apparent and in part pointed out hereinafter.

BRIEF DESCRIPTION OF THE DRAWINGS

FIG. 8 is a plan view of a sheet metal stamping adapted to be formed into the channel nut of FIG. 1; and, FIG. 9 is a plan view of a sheet metal stamping adapted to be formed into the carrier of FIG. 1.

Corresponding reference characters indicate corresponding parts throughout the several views of the drawings.

DESCRIPTION OF THE PREFERRED EMBODIMENTS

Figures 2A, 2B, 2C:
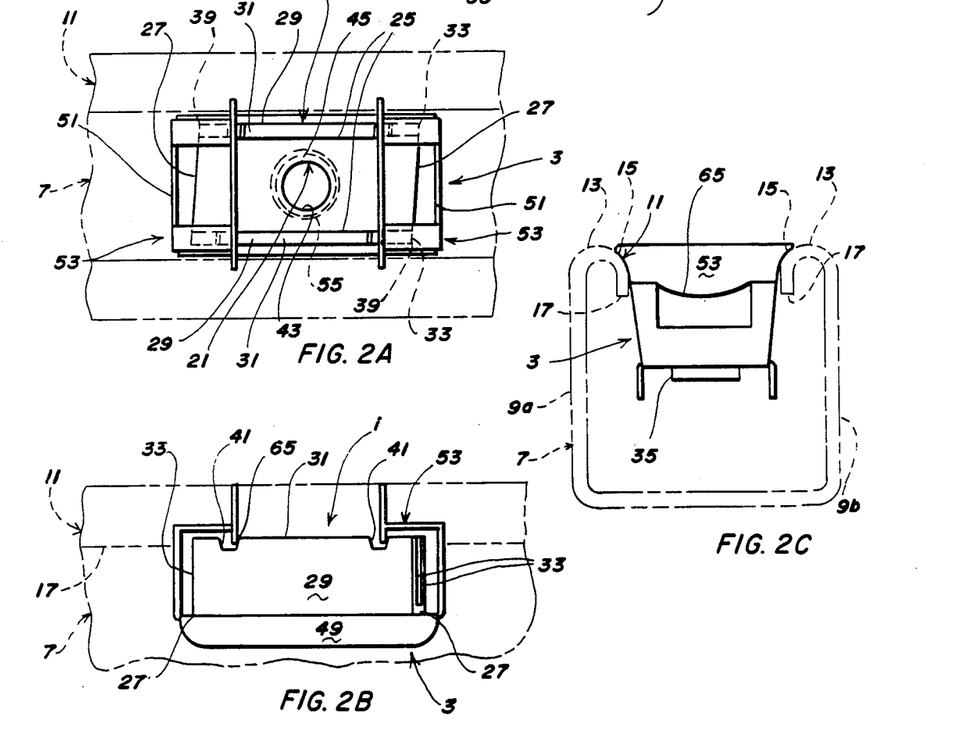
FIG. 2A is a top plan view of the channel nut of FIG. 1 showing the nut and the carrier aligned with a channel slot.
FIG. 2B is a side elevation of the channel nut and carrier of FIG. 2A.
FIG. 2C is an end elevation of the channel nut and carrier of FIG. 2A.
Figure 3A:
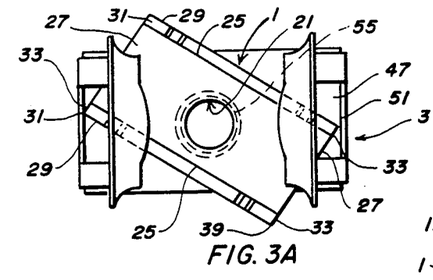
FIG. 3A is a top plan view of the channel nut of FIG. 1 showing the nut partially rotated on the carrier less than a quarter of a turn.
Figure 3B:
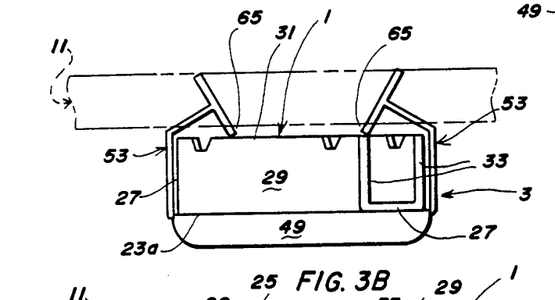
FIG. 3B is a side elevation of the channel nut and carrier of FIG. 3A.
Figure 3C:
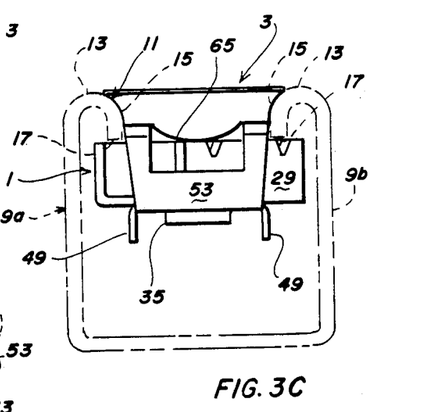
FIG. 3C is an end elevation of the channel nut and carrier of FIG. 3A.
Figure 4A:
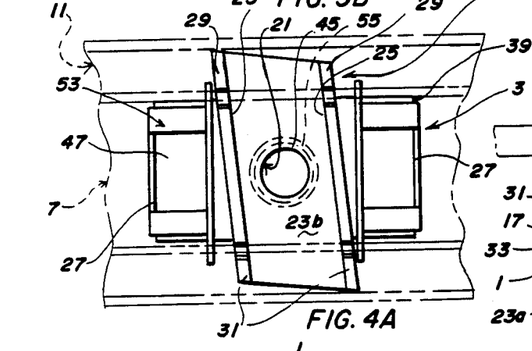
FIG. 4A is a top plan view of the channel nut of FIG. 1 showing the channel nut rotated on the carrier into generally crosswise position relative to the slot.
Figure 4B:
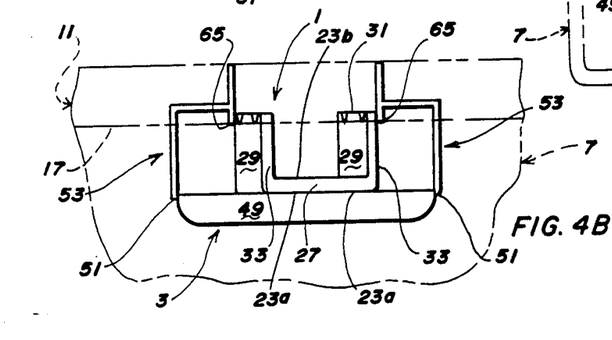
FIG. 4B is a side elevation of the channel nut and carrier of FIG. 4A.
Figure 4C:
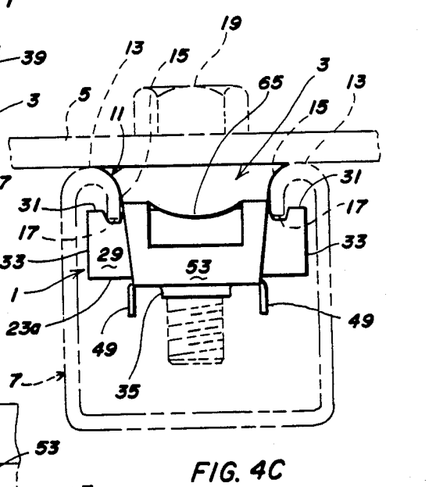
FIG. 4C is an end elevation of the channel nut and carrier of FIG. 4A.

Referring now to FIGS. 1-4B, a channel nut of this invention is indicated in its entirety at 1 as is shown in FIG. 4C mounted on a carrier 3 securing a part 5 (such as a bracket) to a metal channel framing or support 7. The channel has a pair of side walls or flanges 9a, 9b, the outer ends of which have inwardly directed lips formed thereon as indicated generally at 11 with portions 13 forming a surface against which part 5 is locked. The lips are hook shaped, having curved outside faces 15 terminating in inside faces or edges 17, and are spaced from one another to define a slot S therebetween which extends the length of the channel. As illustrated, part 5 spans slot S and bears on portions 13 of the channel lips at opposite sides of the slot, the part being locked in position by means of a conventional bolt 19 extending through the part and threaded into a tapped hole 21 in channel nut 1.

Figure 1:
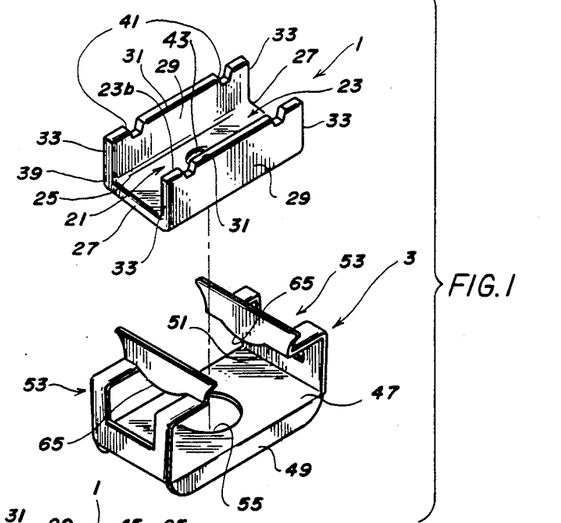
FIG. 1 is a perspective view of a first embodiment of a channel nut of this invention exploded from a carrier adapted for use therewith.

More particularly, channel nut 1 comprises an elongate body having a generally planar base or bottom 23 with an inside face 23a and an outside face 23b, opposite sides 25 and opposite ends 27. Opposite sides 25 of the base have outwardly turned flanges 29, and each flange 29 has a top base-remote edge 31 and opposite ends 33. Tapped hole 21 is centrally formed in bottom 23 and includes a threaded collar 35. The length of channel nut 1 is greater than the width of channel slot S (but less than the distance between channel side flanges 9a, 9b), the width of the nut is less than the width of the slot S so that the nut may be inserted in and installed on the channel in a manner to be hereinafter described.

Figures 8, 9:
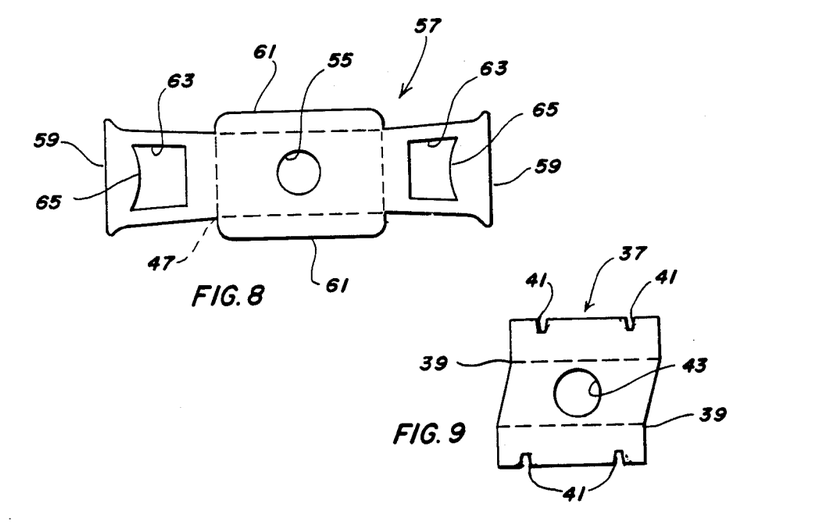

Channel nut 1 can be economically made as an integral one-piece part of channel shape from a length of channel which is cut into sections having the form of a flat stamping generally designated 37 in FIG. 9. As illustrated, bottom 23 is preferably rhomboid with diagonally opposite corners offset as indicated at 39 to facilitate turning the body generally crosswise in the channel. The rhomboid shape also increases the area of contact between top edges 31 of flanges 29 and inside edges 17 to assure that nut 1 remains in position on the channel. Grooves or notches 41 are formed in the top edges 31 of the flanges 29 adjacent ends 33 thereof the notches 41 in one flange being generally aligned with the notches in the other flange for receiving respective edges 17 of the channel 5 when the nut is rotated in the channel. As illustrated, notches 41 are sloped opening outwardly from the bottom for better bite with inside edges 17 of the channel lips to assure that the fastener remains in position on the channel (even a vertical channel) when installed. Tapped hole 21 is formed in bottom 23 by punching a hole 43 through the bottom extruding a ring of metal with is then tapped forming collar 35. When hole 43 is punched through bottom 23 from outside face 23b towards inside face 23a, the punch forms a recess 45 on the outside face which provides a lead in for bolt 19. On the other hand, when hole 43 is punched through bottom 23 from inside face 23a towards outside face 23b, the inside face of the bottom presents a smooth surface to the inside of the channel against which conductors in the channel raceway can be packed without damage.

Channel nut 1 can be installed in metal channel framing 7 by hand and held in generally crosswise position against inside edges 17 with finger pressure while part 5 is attached with bolt 19. For some applications, however, it is preferred that channel nut 1 be rotatably mounted in a carrier which does not rotate with respect to channel 7 such as carrier 3.

Carrier (or cage) 3 is formed of a resilient material such as tempered carbon 1050 or 1060 steel, plastic or the like for clamping channel nut 1 in place when the nut is installed in channel 7. Cage 3 comprises an elongate platform 47 preferably reinforced with downwardly turned side flanges 49. Opposite ends 51 are suspended on non-linear arms 53 which bridge the channel slot S and engage curved outside faces 15 of the channel lips below portions 13 to avoid interfering with locking part 5. Platform 47 has a width slightly less than the width of channel slot S so that it may be inserted in the slot, and it has a length such that channel nut 1 can be mounted lengthwise on the platform and rotated as described below. A means for rotatably mounting nut 1 on platform 47 comprises a hole 55 in platform 47 through which collar 35 can be passed. Collar 35 serves as a spindle for rotation of nut 1 in hole 55 and, if peened over, forms an attachment between the nut and the carrier.

When carrier 3 is made from 1050 or 1060 steel, it can be economically made from a flat stamping generally designated 57 in FIG. 8. Stamping 57 has a pair of projections 59 extending from ends 51 of the section forming platform 47 and a pair of shorter projections 61 extending from the sides thereof. Each of projections 59 includes an aperture 63 with an arcuate side as indicated at 65. When projections 59 are bent upwardly and inwardly into a generally Z-shape in cross section, projections 59 form non-linear arms 53 and when projections 61 are bent downwardly, projections 61 form side flanges 49. After flat stamping 57 is bent into shape, the carrier is heat treated and black guarded to prevent rusting.

To install nut 1 on channel 7, nut 1 is mounted on and aligned with platform 47. The platform is passed through slot S from the outside to the inside thereof until non-linear arms 53 engage curved outside faces 15 of the channel lips. Nut 1 is then rotated within carrier 3 through slightly less than a quarter a turn to the right (i.e., clockwise as viewed from above slot S) to a position in which the nut extends at a slight angle to crosswise with respect to slot S (as a result the rhomboid shape of bottom 23). Offsets 39 facilitate rotation of nut 1 to this crosswise position and further rotation is prevented by the other corners of the nut.

At the start of rotation as illustrated in FIGS. 2A–2C, arcuate surface 65 of aperture 63 is received in the inboard side of notches 41. As illustrated in FIGS. 3A–3C when the nut starts to rotate, arcuate surface 65 cams out of notches 41 pressing inwardly on top edges 31 of side flanges 29 and applying an effective force on non-linear arms 53 such that there is a net opening of the arms. As non-linear arms 53 open, their effective length increases, lowering platform 47 such that nut 1 can rotate under inside edges 17 of the channel. Continued rotation of nut 1 causes arcuate surface 65 to slide along top edges 31 until nut 1 passes underneath. With continued rotation as shown in FIGS. 4A–4C, inside edges 17 are received in notches 41 and held therein by the spring action of non-linear arms 53.

A second channel nut 67 in accordance with the present invention is shown in FIGS. 5A–5D. Channel nut 67 has much in common with channel nut 1 including bottom 23 with an inside face 23a and an outside face 23b, opposite sides 25 and opposite ends 27. Opposite sides 25 have outwardly turned flanges 29 and flanges 29 have top edges 31 and opposite ends 33. Tapped hole 21 is centrally formed in bottom 23. Bottom 23 is rhomboid and ends 33 have outwardly turned flanges 69 which are taller than flanges 29. Flanges 69 have top edges 71 opposite ends of which are spiked at 73. A coil spring 75 is attached to inside face 23a for use as described hereinafter.

In use, nut 67 is aligned with slot S and passed from the outside to the inside thereof. By pressing upon outside face 23b, coil spring 75 is compressed and nut 1 can be turned approximately a quarter of a turn to the right until stopped by the corners of bottom 23 opposite offset corners 39. When pressure on outside face 23b is released, coil spring 75 reacts against the bottom of metal channel 7 pushing the ends of flanges 49 against inside channel edges 17. Nut 67 is dimensioned such that flanges 69 are received between side flanges 9a, 9b and inwardly directed lips 11 with spikes 73 biting the inside of channel 7 approximately underneath portions 13.

Figures 5A, 5B, 5C, 5D, 6A, 6B, 6C, 6D:
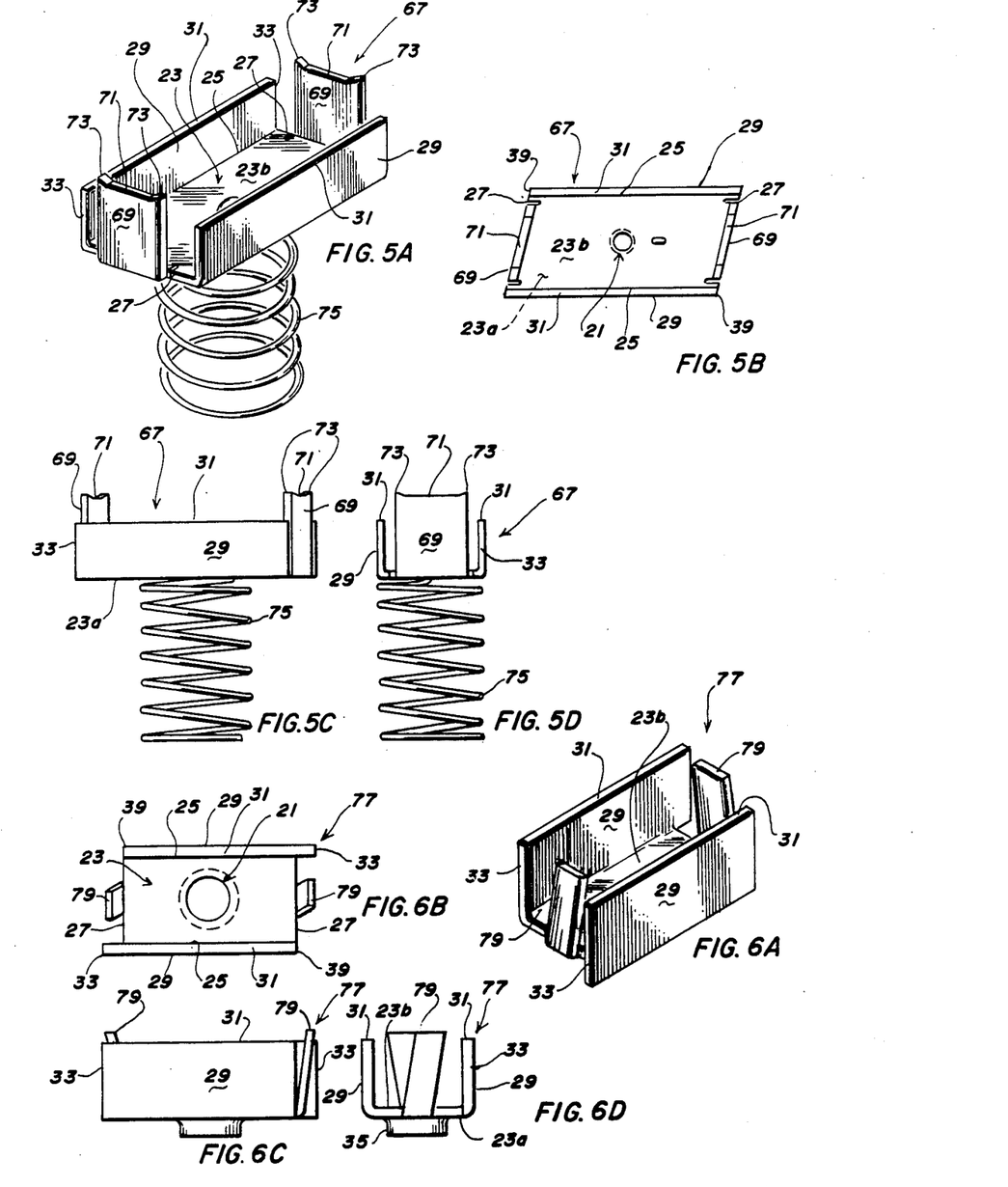
FIG. 5A is a perspective view of a second embodiment of a channel nut of this invention.
FIG. 5B is a top plan view of the channel nut of FIG. 5A.
FIG. 5C is a side elevation of the channel nut of FIG. 5A.
FIG. 5D is an end elevation of the channel nut of FIG. 5A.
FIG. 6A is a perspective view of a third embodiment of a channel nut of this invention.
FIG. 6B is a top plan view of the channel nut of FIG. 6A.
FIG. 6C is a side elevation of the channel nut of FIG. 6A.
FIG. 6D is an end elevation of the channel nut of FIG. 6A.
Figure 7A:
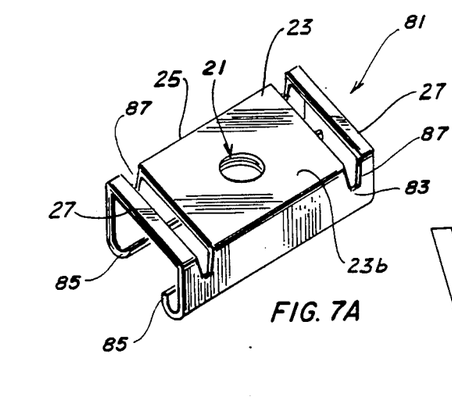
FIG. 7A is a perspective view of a fourth embodiment of a channel nut of this invention.
Figure 7B:
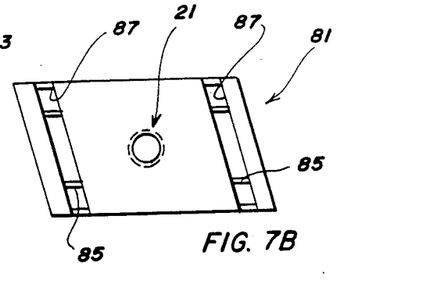
FIG. 7B is a top plan view of the channel nut of FIG. 7A.
Figure 7C:
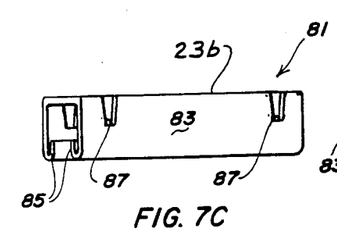
FIG. 7C is a side elevation of the channel nut of FIG. 7A.
Figure 7D:
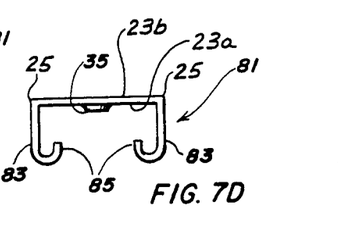
FIG. 7D is an end elevation of the channel nut of FIG. 7A.

A third channel nut 77 in accordance with the present invention is shown in FIGS. 6A–6B. Channel nut 77 like nut 67 has much in common with channel nut 1 including bottom 23 with an inside face 23a and outside face 23b, opposite sides 25 and opposite ends 27. Opposite sides 25 have outwardly turned flanges 29 and flanges 29 have top edges 31 and opposite ends 33. Tapped hole 21 is centrally formed in bottom 23 and includes threaded collar 35. Bottom 23 is rhomboid and ends 33 have outwardly turned flanges 79 which are angled away from bottom 23.

In use, nut 77 is aligned with slot S and passed from the outside to the inside thereof. The nut is turned approximately a quarter of a turn to the right until stopped by the corners of bottom 23 opposite offset corners 39. Nut 79 is dimensioned such that when it is raised in channel 7 against inside edges 17 by the user, flanges 79 wedge bottom 23 between the inside of side flanges 9a, 9b and thereby support the nut.

A fourth channel nut, generally designated 81, in accordance with the present invention is shown in FIGS. 7A–7D. Like nuts 1, 67 and 77, channel nut 81 includes a generally planar base 23 with an inside face 23a and outside face 23b, opposite sides 25 and opposite ends 27. Unlike the previously discussed nuts, however, opposite sides 25 of the base have inwardly (downwardly) turned flanges 83, the base-remote (lower) edges of which have inwardly turned lips as indicated generally at 85. Tapped hole 21 is centrally formed in base 23 and includes threaded collar 35. Base 23 is rhomboid and parallel recesses in the form of grooves or notches 87 extend across outside face 23b adjacent ends 27. As illustrated, notches 87 reach inwardly (down) into flanges 83 from a plane generally corresponding to the outside face 23b of the base of the nut. These notches open outwardly relative to the slot S in the channel when the nut is in its crosswise position and are sloped (i.e., the side edges of each notch in the flanges 83 diverge away from the bottom of the notch) for better bite with the inside edges 17 of the channel lips.

In use, by positioning grooves or notches 87 in outside face 23b and flanges 83, base 23 is brought above inside edges 17 of the channel when nut 81 is in its generally crosswise position with inside channel edges 17 received in notches 87. In consequence, tapped hole 21 is elevated towards part 5 and nut 81 can be used in shallower channels than is possible with solid steel channel nuts of comparable thickness.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. For securement to metal framing having a slot and inside and outside faces on opposite sides of the slot for attachment of parts to the framing through the slot from the outside of the slot, a channel nut comprising an elongate body having a rhomboid bottom with an inside face and an outside face, opposite sides and opposite ends, said opposite sides having outwardly turned flanges each with a top edge and opposite ends, said flanges having notches in the top edges thereof adjacent the ends of the flanges, said notches opening outwardly from the bottom for better bite with the inside faces of the metal framing, said bottom having a tapped hole punched therethrough, the width of said body between said sides being less than the width of the slot in the framing whereby the body may be generally aligned with the slot, entered into the slot and passed through the slot from the outside to the inside of the framing and then turned to extend in generally crosswise position relative to the slot for engagement of portions of the top edges of the flanges adjacent the ends thereof with the inside faces of the framing at opposite sides of the slot.

2. For securement to metal framing having a slot and inside and outside faces on opposite sides of the slot for attachment of parts to the framing through the slot from the outside of the slot, a channel nut comprising an elongate body having a rhomboid bottom with an inside face and an outside face, opposite sides and opposite ends, said opposite sides having outwardly turned flanges each with a top edge and opposite ends, said opposite ends of the bottom having outwardly turned flanges each having a top edge with opposite ends and spikes at the opposite ends, said spikes biting into the metal framing when the nut is in generally crosswise position against the inside faces of the framing, said bottom having a tapped hole punched therethrough, the width of said body between said sides being less than the width of the slot in the framing whereby the body may be generally aligned with the slot, entered into the slot and passed through the slot from the outside to the inside of the framing and then turned to extend in generally crosswise position relative to the slot for engagement of portions of the top edges of the flanges adjacent the ends thereof with the inside faces of the framing at opposite sides of the slot.

3. For securement to metal framing having a slot and inside and outside faces on opposite sides of the slot for attachment of parts to the framing through the slot from the outside of the slot, a channel nut comprising an elongate body having a rhomboid bottom with an inside face and an outside face, opposite sides and opposite ends, said opposite ends of the bottom having outwardly turned flanges which are angled away from the bottom, said end flanges wedging against the outside face of the metal framing when the nut is in a generally crosswise position against the inside faces of the framing, said bottom having a tapped hole punched therethrough, the width of said body between said sides being less than the width of the slot in the framing whereby the body may be generally aligned with the slot, entered into the slot and passed through the slot from the outside to the inside of the framing and then turned to extend in a generally crosswise position relative to the slot for engagement of portions of the top edges of the flanges adjacent the ends thereof with the inside faces of the framing at opposite sides of the slot.

4. For securement to metal framing having a slot and inside and outside faces on opposite sides of the slot for attachment of parts to the framing through the slot from the outside of the slot, a channel nut comprising an elongate body having a rhomboid base with an inside face and an outside face, opposite sides and opposite ends, said opposite sides of the base having inwardly turned flanges with opposite ends, said base having notches extending across the outside face of the bottom adjacent the ends thereof and into the inwardly turned flanges, said notches opening outwardly from the bottom for better bite with the inside faces of the metal framing, said bottom having a tapped hole extending therethrough, the width of said body between said sides being less than the width of the slot in the framing whereby the body may be generally aligned with the slot, entered into the slot and passed through the slot from the outside to the inside of the framing and then turned to extend in a generally crosswise position relative to the slot for engagement of portions of the outside face of the bottom adjacent the ends thereof with the inside faces of the framing at opposite sides of the slot.

5. In combination with a channel having a bottom and a pair of side walls with inwardly directed lips formed thereon defining a slot therebetween extending the length of the channel, said lips terminating in edges extending lengthwise of the channel at opposite sides of the slot, a nut for securing an object to the channel, said nut being an integral one-piece part of channel shape thereby to have a base with opposite sides and opposite ends, a pair of side flanges at opposite sides of the base having base-remote edges extending lengthwise of the nut, and a threaded opening through the base, said nut having a width less than the width of the channel slot and a length greater than the width of the slot whereby the nut may be generally aligned with the slot, entered into the slot and passed through the slot from the outside to the inside of the channel and then turned to extend in a generally crosswise position relative to the slot with the nut engaging the edges of the channel lips adjacent the ends of the base of the nut and with the side flanges of the nut being disposed generally transversely of the slot and extending from the base toward the bottom of the channel so that said base-remote edges of the flanges are spaced away from the channel lips below the channel slot, a threaded fastener being cooperable with the nut when the nut is in its crosswise position to secure said object to the channel, said threaded fastener being threadable through the threaded opening of the nut to draw the nut into clamping engagement with the edges of the channel lips on the inside of the channel and to draw said object into clamping engagement with the channel lips on the outside of the channel.

6. The combination of claim 5 wherein said nut is formed from sheet metal of substantially uniform thickness.

7. The combination of claim 5 wherein the nut has recesses in its side flanges immediately adjacent the base of the nut and opening outwardly relative to the slot when the nut is in its said crosswise position for receiving therein the edges of the channel lips.

8. The combination of claim 7 wherein said base is generally planar, having an inside face and an outside face, said recesses in the side flanges extending inwardly from a plane generally corresponding to the outside face of the base.

9. The combination of claim 7 wherein said recesses are in the form of notches in the side flanges extending inwardly away from the base.

10. The combination of claim 9 wherein each of said notches has a bottom and side edges diverging away from the bottom.

11. The combination of claim 10 wherein said base is generally planar, having an inside face and an outside face, said notches in the side flanges extending inwardly from a plane generally corresponding to the outside face of the base.

12. The combination of claim 5 wherein said nut is rhomboid in shape for enabling it to be turned to its said crosswise position.

13. The combination of claim 5 wherein said base is recessed in an area surrounding said threaded opening to provide a lead-in for a bolt to be threaded into the opening.

14. In combination with a channel having a pair of side walls with inwardly directed lips formed thereon defining a slot therebetween extending the length of the channel, said lips terminating in edges extending lengthwise of the channel at opposite sides of the slot, a nut for securing an object to the channel, said nut being an integral one-piece part of channel shape thereby to have a base with opposite sides and opposite ends, a pair of side flanges extending generally at right angles to the base at opposite side of the base and having base-remote edges extending lengthwise of the nut, and a threaded opening through the base, said nut having a width less than the width of the channel slot and a length greater than the width of the slot whereby the nut may be generally aligned with the slot, entered into the slot and passed through the slot from the outside to the inside of the channel and then turned to extend in a generally crosswise position relative to the slot with the base-remote edges of the flanges of the nut engaging the edges of the channel lips and with the base of the nut being disposed below the slot, a threaded fastener being cooperable with the nut when the nut is in its said crosswise position to secure said object to the channel, said threaded fastener being threadable through the threaded opening of the nut to draw said base-remote edges of the flanges of the nut into clamping engagement with the edges of the channel lips on the inside of the channel and to draw said object into clamping engagement with the channel lips on the outside of the channel.

15. The combination as set forth in claim 14 wherein said nut is formed from sheet metal of substantially uniform thickness.

16. The combination of claim 15 wherein said base-remote edges of the flanges have notches therein opening outwardly relative to the slot when the nut is in its said crosswise position for receiving therein the edges of the channel lips.

17. The combination of claim 16 wherein said nut is rhomboid in shape for enabling it to be turned to its said crosswise position.

18. The combination of claim 14 wherein said base is recessed in an area surrounding said threaded opening to provide a lead-in for a bolt to be threaded into the opening.

19. For use with a channel having a bottom and a pair of side walls with inwardly directed lips formed thereon defining a slot therebetween extending the length of the channel, said lips terminating in edges extending lengthwise of the channel at opposite sides of the slot, a nut for securing an object to the channel, said nut being an integral one-piece part of channel shape thereby to have a base with opposite sides and opposite ends, a pair of side flanges at opposite sides of the base having base-remote edges extending lengthwise of the nut, and a threaded opening through the base, said nut having a width less than the width of the slot whereby the nut may be generally aligned with the slot, entered into the slot and passed through the slot from the outside to the inside of the channel and then turned to extend in a generally crosswise position relative to the slot for engagement of the nut with the edges of the channel lips adjacent the ends of the base of the nut and with the side flanges of the nut being disposed generally transversely of the slot and extending from the base toward the bottom of the channel so that said base-remote edges of the flanges are spaced away from the channel lips below the channel slot.

20. A nut as set forth in claim 19 wherein said nut is formed from sheet metal of substantially uniform thickness.

21. A nut as set forth in claim 20 wherein the nut has recesses in its side flanges immediately adjacent the base of the nut and opening outwardly relative to the slot for receiving therein the edges of the channel lips when the nut is in its said crosswise position.

22. A nut as set forth in claim 21 wherein said base is generally planar, having an inside face and an outside face, said recesses in the side flanges extending inwardly from a plane generally corresponding to the outside face of the base.

23. A nut as set forth in claim 19 wherein said recesses are in the form of notches in the side flanges extending inwardly away from the base.

24. A nut as set forth in claim 23 wherein each of said notches has a bottom and side edges diverging away from the bottom.

25. A nut as set forth in claim 24 wherein said base is generally planar, having an inside face and an outside face, said notches in the base-adjacent edges of the end portions of the side flanges extending inwardly from a plane generally corresponding to the outside face of the base.

26. A nut as set forth in claim 19 wherein said nut is rhomboid in shape for enabling it to be turned to its said crosswise position.

27. A nut as set forth in claim 19 wherein said base is recessed in an area surrounding said threaded opening to provide a lead-in for a bolt to be threaded into the opening.

28. For use with a channel having a pair of side walls with inwardly directed lips formed thereon defining a slot therebetween extending the length of the channel, said lips terminating in edges extending lengthwise of the channel at opposite sides of the slot, a nut for securing an object to the channel, said nut being an integral one-piece part of channel shape thereby to have a base with opposite sides and opposite ends, a pair of side flanges extending generally at right angles to the base at opposite sides of the base and having base-remote edges extending lengthwise of the nut, and a threaded opening through the base, said nut having a width less than the width of the channel slot and a length greater than the width of the slot whereby the nut may be generally aligned with the slot, entered into the slot and passed through the slot from the outside to the inside of the channel and then turned to extend in a generally crosswise position relative to the slot for engagement of the base-remote edges of the flanges of the nut with the edges of the channel lips with the base of the nut disposed below the slot.

29. A nut as set forth in claim 28 wherein said nut is formed from sheet metal of substantially uniform thickness.

30. A nut as set forth in claim 28 wherein said base-remote edges of the flanges have notches therein opening outwardly relative to the slot when the nut is in its said crosswise position for receiving therein the edges of the channel lips.

31. A nut as set forth in claim 30 wherein said nut is rhomboid in shape for enabling it to be turned to its said crosswise position.

32. A nut as set forth in claim 28 wherein said base is recessed in an area surrounding said threaded opening to provide a lead-in for a bolt to be threaded into the opening.

* * * * *

UNITED STATES PATENT AND TRADEMARK OFFICE
CERTIFICATE OF CORRECTION

PATENT NO. : 5,054,978

DATED : October 8, 1991

INVENTOR(S) : Joseph W. Kowalski

It is certified that error appears in the above-identified patent and that said Letters Patent is hereby corrected as shown below:

Column 7, claim 2, line 8, "flanges each" should read ---flanges which are taller than the side flanges, said end flanges each---.

Column 8, claim 14, line 68, "side" should read ---sides---.

Column 9, claim 19, line 47, "width of the slot whereby" should read ---width of the channel slot and a length greater than the width of the slot whereby---.

Signed and Sealed this

Twenty-third Day of March, 1993

*Attest:*

STEPHEN G. KUNIN

*Attesting Officer*   Acting Commissioner of Patents and Trademarks